United States Patent [19]

Suzuki

[11] Patent Number: 4,991,677

[45] Date of Patent: Feb. 12, 1991

[54] EXAMINATION DEVICE IN A VEHICLE CONSTANT SPEED CONTROL APPARATUS

[75] Inventor: Fujiyuki Suzuki, Shizuoka, Japan

[73] Assignee: Suzuki Jidosha Kogyo Kabushiki Kaisha, Shizuoka, Japan

[21] Appl. No.: 520,858

[22] Filed: May 10, 1990

Related U.S. Application Data

[63] Continuation of Ser. No. 279,556, Dec. 2, 1988, abandoned.

[30] Foreign Application Priority Data

Dec. 10, 1987 [JP] Japan .................. 62-310941

[51] Int. Cl.⁵ .............................................. B60K 31/04
[52] U.S. Cl. ........................................ 180/179; 364/426.04
[58] Field of Search .............. 180/170, 178, 179, 176; 364/426.04

[56] References Cited

U.S. PATENT DOCUMENTS

| | | | |
|---|---|---|---|
| 4,140,202 | 2/1979 | Noddings et al. | 364/426.04 |
| 4,365,298 | 12/1982 | Sibley | 180/179 |
| 4,434,469 | 2/1984 | Suzuki et al. | 180/179 |
| 4,522,280 | 6/1985 | Blaney | 180/179 |
| 4,797,826 | 1/1989 | Onogi et al. | 180/179 |

FOREIGN PATENT DOCUMENTS

| | | | |
|---|---|---|---|
| 0090215 | 5/1983 | Japan | 364/426.04 |
| 0282134 | 12/1986 | Japan | 180/178 |
| 291225 | 12/1986 | Japan | |

Primary Examiner—David M. Mitchell
Attorney, Agent, or Firm—Flynn, Thiel, Boutell & Tanis

[57] ABSTRACT

An examination device for use with a vehicle constant speed control apparatus which adjusts the speed of a vehicle to a predetermined speed in response to a constant speed control command includes a first switching arrangement for connecting and disconnecting an electric power supply and the apparatus, and a second switching arrangement for delivering the constant speed control command. A control arrangement is provided for inhibiting the constant speed control of the vehicle when the second switching arrangement is on at the time the first switching arrangement is connected.

2 Claims, 2 Drawing Sheets

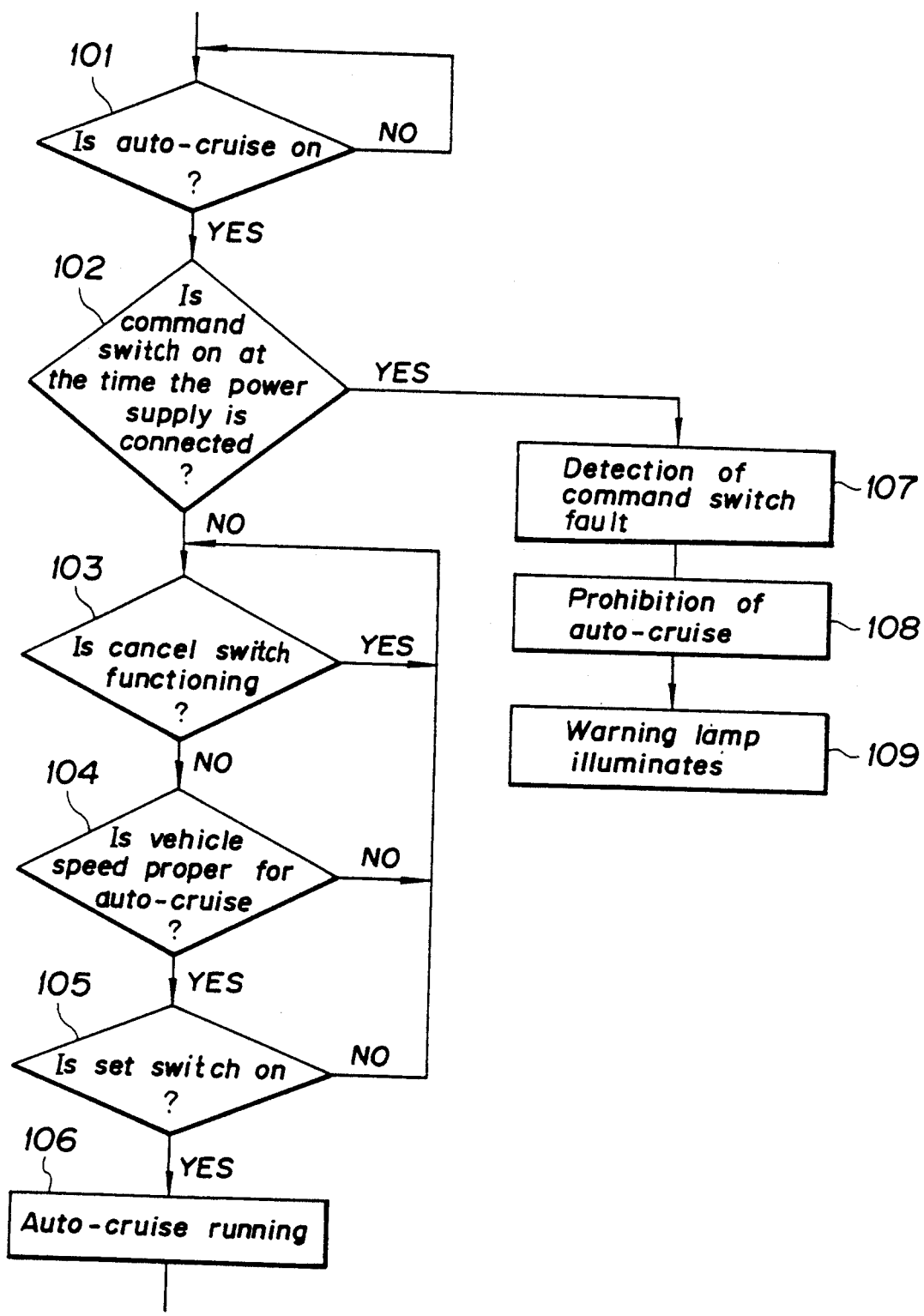

EXAMINATION DEVICE IN A VEHICLE CONSTANT SPEED CONTROL APPARATUS

This application is a continuation of U.S. Ser. No. 279,556, filed Dec. 2, 1988, now abandoned.

FIELD OF THE INVENTION

The present invention relates to an examination device for a vehicle constant speed control apparatus, particularly one which detects a malfunction of the control switch at an early stage and stops the constant speed control of the vehicle so that the vehicle can be prevented from running under no control, thus improving its safety.

BACKGROUND OF THE INVENTION

A constant speed control apparatus is known which enables an automotive vehicle to run constantly at a speed predetermined by a driver while the accelerator, normally a foot-operated pedal, remains undepressed by the driver. The known constant speed control apparatus is arranged such that an actuator is activated upon receiving a constant speed control command and allows a cruise cable to actuate a throttle valve for specific opening and closing thereof.

Such a constant speed control apparatus is disclosed in Japanese Patent Publication No. 61-291225 (1986), in which if a brake switch or relay is inoperable and thus fails to cancel (i.e. shut off) the constant speed control system when the brake is actuated, a trouble detecting arrangement detects a fault in the system and then, according to the detected information, a control arrangement actuates the throttle valve for returning it to the neutral position to thus cancel the constant speed running and ensure safe driving.

The prior art constant speed control apparatus incorporates a command switch acting as a control switch and a cancel switch acting as a reset switch and connected to a main isolator switch for the main power supply. The main power supply switch may be either activated in relation to an ignition switch or turned on and off independently of the ignition switch. Accordingly, the main power supply switch as connected and disconnected independently of the ignition switch is commonly kept closed for the purpose of constant power supply to the control arrangement. As a result, when the running speed of the vehicle exceeds a specified speed with the control switch (e.g. a set switch) being turned on, the vehicle continues to run at an incremental (i.e. varying) speed or at a constant speed but under no control, thus creating a disadvantage in the control.

A primary object of the present invention is to overcome the aforesaid problem by enabling a vehicle constant speed control apparatus to detect, at an early stage, a malfunction wherein the control switch is closed at the time the main power supply switch is switched on and to stop (i.e. shut off or deactivate) the constant speed control of the vehicle so that the vehicle can be prevented from running under no control, thus improving its safety.

SUMMARY OF THE INVENTION

The present invention is directed towards a device for use with a vehicle constant speed control apparatus for adjusting the vehicle for running at a predetermined speed in response to a constant speed control command, comprising a main power supply switch for connecting and disconnecting the electric power supply, a control switch for sending the constant speed control command, and a control device for stopping the constant speed control of the vehicle when the control switch is on at the time the main power supply switch is connected.

In an arrangement according to the present invention, the constant speed control of a vehicle is enabled when the control switch is off at the time the main power supply switch is connected so that the vehicle can run at a constant speed only under the condition of constant speed control. On the other hand, when the control switch is on at the time the main power supply switch is connected, the arrangement stops the constant speed control, and thus the vehicle will be released or disconnected from the constant speed control. Accordingly, the arrangement causes the constant speed control to stop when a fault function of the control switch is detected, thus preventing the vehicle from running under no control and ensuring safe operation.

BRIEF DESCRIPTION OF THE DRAWINGS

FIGS. 1 to 3 illustrate one embodiment of the present invention, in which:

FIG. 1 is a schematic view showing an internal combustion engine and a constant speed running control apparatus;

FIG. 2 is a circuit diagram of the constant speed running apparatus; and

FIG. 3 is a flow chart showing a procedure of operation according to the embodiment.

DETAILED DESCRIPTION

One embodiment of the present invention will be described in detail and in a practical manner with reference to the drawings.

Figure 1:
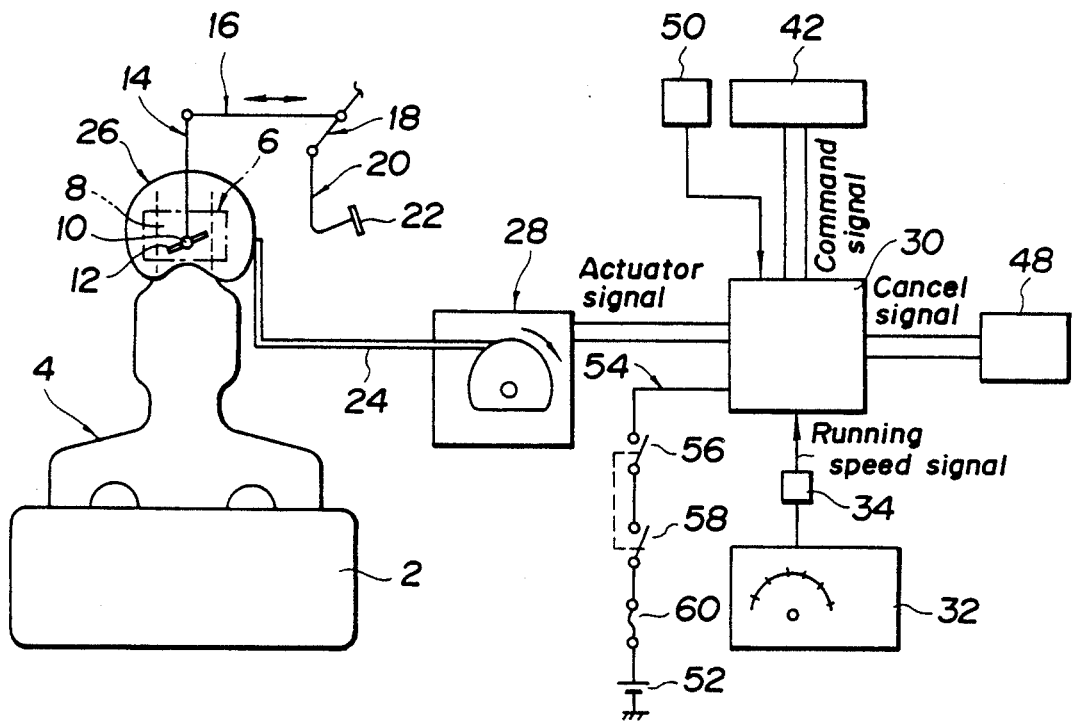
Figure 2:
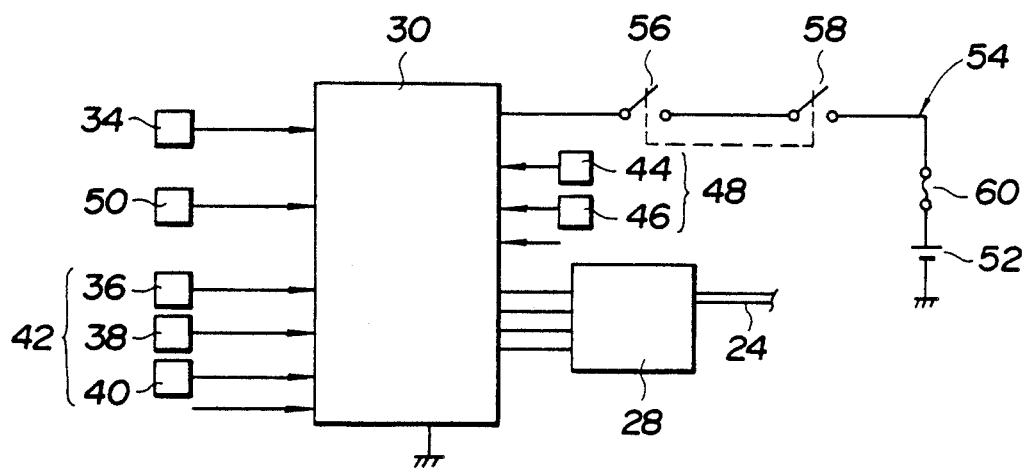

FIGS. 1 to 3 illustrate an embodiment of the present invention in which the numerals 2 and 4 are an internal combustion engine and a suction manifold, respectively, for an automotive vehicle. The suction manifold 4 is connected at its upstream side with a carburetor 6 having a suction passage 8 therein in which a throttle valve 12 is fixedly disposed on a movable throttle valve axle 10. The throttle valve axle 10 is in turn connected to an accelerator pedal 22 via a first link member 14, a second link member 16, a third link member 18, and an accelerator arm 20.

The throttle valve axle 10 is also joined to a link unit 26 which is connected with a cruise cable 24 at one end thereto and at the other end to an actuator 28. The actuator 28 actuates the cruise cable 24 for forward and backward movement upon receiving actuator signals, which are command signals, from a control means or device 30 for constant speed running of the vehicle, so that the throttle valve 12 can be controlled for specific opening and closing movement.

As shown in FIGS. 1 and 2, the control device 30 is communicated with: a vehicle speed sensor 34 for detecting vehicle running speed in relation to a vehicle speedometer 32; a command switch 42 (a control switch) comprising a coast switch 36, a return switch 38, a set switch 40, and others; a cancel switch 48 (a reset switch) comprising a brake switch 44, a clutch switch 46, and others (including an inhibit switch when an automatic gear shifting device is installed in the vehicle); and an engine revolution sensor 50.

The coast switch 36 causes the vehicle to run either at a decremental speed when remaining at its on-position or at the constant speed determined and recorded at the moment it is turned off.

The return switch 38 when turned on provides a state of automatic running so that the running speed can return to the prior set speed when the cancellation is made.

The set switch 40 when turned on during running at a desired speed allows the vehicle to run in the automatic running condition upon recording the desired speed and when turned on during the running under the constant speed running condition, allows the vehicle to run at an incremental speed so long as being turned to the ON position and at the constant speed determined at the moment when it is turned off.

Thus, the control device 30 delivers an actuator signal (command signal) for constant speed control to the actuator 28 in response to the activation or turning on of any component of the command switch 42.

Additionally as shown in FIGS. 1 and 2, the control device 30 is also connected with a power line 54 connected to a battery 52. The power line 54 has a main switch 56 for power supply, an ignition switch 58, and a fuse 60 disposed thereon in this order from the control device 30. The main power supply switch 56 is linked with the ignition switch 58 in action so as to disconnect when the ignition switch 58 is turned off.

According to the arrangement of this embodiment, the control device 30 renders the constant speed control of the vehicle operable when the command switch 42 is off at the time the main power supply switch is connected, and also prohibits the execution of the same when the command switch 42 is on at the time the main power supply switch 56 is connected.

The control device 30 may be implemented using a suitable conventional microprocessor circuit. The operation described below will be recognized as being within the capabilities of such a circuit.

The operation according to the embodiment will be described with reference to FIG. 3.

At the step 101, it is examined whether the main power supply switch 56 is turned on or off after the ignition switch 58 is turned on, i.e. the power supply is connected for constant speed control (auto cruise). If the main power supply switch 56 is off thus indicating "NO" at step 101, repeat the procedure in the same step.

If "YES" with the main power supply switch 56 being connected, it is then examined at step 102 whether the command switch 42, a control switch, is on at the time the main power supply switch 56 is switched on.

If "NO" at step 102, it is examined at the next step 103 whether the cancel switch 48 is turned on. If "YES" at step 103 indicating that the cancel switch 48 is activated, repeat the procedure in the same step.

If "NO" at step 103 indicating that the cancel switch 48 is disconnected, it is then examined at the next step 104 whether a running speed has been reached to carry out the constant speed control (auto cruise) If "NO" at the step 104, return to step 103.

If "YES" at the step 104 as the speed is increased to execute the constant speed control, it is further examined at the next step 105 whether the set switch 40 in the command switch 42 is turned on. If "NO" at the step 105, return to the step 103.

If "YES" at step 105 indicating that the set switch 40 is connected, then the constant speed control of the vehicle can be executed at step 106. More particularly, the actuator 28 is actuated by an actuator signal supplied from the control device 30, and thus the cruise cable 24 and link unit 26 are actuated to move the throttle valve 12 to the specified opening position so that the vehicle can run at a constant speed.

On the other hand, if "YES" at step 102, that is, if the command switch 42 is on at the time the main power supply switch 56 is connected, it is determined at step 107 that the command switch 42 is not functioning properly, for example, the switch may have failed closed. At the next step 108, the constant speed control is then prohibited or the constant speed device is disabled. Further, at step 109, an indication device is actuated, e.g. to illuminate a flashing light for warning or sound a buzzer, indicating a fault on the command switch 42.

Accordingly, a fault motion in the command switch 42 communicated with the control device 30 is detected at an early stage, whereby the constant speed control can be prohibited while the fault is indicated. Thus, the vehicle will be prevented in advance from running under no control, improving its safety.

According to the present invention as set forth above, the control device is provided for prohibiting use of the constant speed control of the vehicle when the control switch remains on at the time the main power supply switch is connected, so that it can stop the constant speed control when a malfunction of the control switch is detected in the early stage and thus prevent the vehicle from running under no control for improved safety.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A method of implementing constant speed control in a vehicle using a vehicle constant speed control device including command switch means having an operating state for actuating constant speed control, cancel switch means having an operating state for prohibiting constant speed control, and power supply switch means for connecting power to said device, comprising the steps of:

monitoring said power supply switch means until said power connection is detected;

immediately thereafter determining whether said command switch means is in said operating state;

thereafter, prohibiting constant speed control unless said command switch means was not in said operating state immediately after said power connection was detected; and thereafter, and only if said command switch means was not in said operating state immediately after said power connection was detected, performing the steps of:

determining whether said cancel switch means is in its operating state;

thereafter, and only if said cancel switch means is in its operating state, repeatedly determining whether said cancel switch means is in its operating state until it is determined that said cancel switch means is not in its operating state;

thereafter, determining whether the vehicle has reached a speed which is proper for constant speed control;

thereafter, and only if the vehicle has not yet reached a proper speed for constant speed control, repeatedly determining whether said cancel switch means is in its operating state and whether the vehicle has reached a proper speed for constant speed control until it is determined that said cancel switch means is not in its operating state and that the vehicle has reached a proper speed for constant speed control;

thereafter, determining whether said command switch means is in its operating state;

thereafter, and only if said command switch means is not in its operating state, repeatedly determining whether said cancel switch means is in its operating state, whether the vehicle has reached a proper speed for constant speed control, and whether said command switch means is in its operating state, until it is determined that said cancel switch means is not in its operating state, that the vehicle has reached a proper speed for constant speed control, and that said command switch means is in its operating state; and thereafter, actuating constant speed control of the vehicle.

2. A constant speed control device for causing a moving vehicle to maintain a predetermined cruising speed, comprising:

a vehicle engine, a carburetor in which an air-fuel mixture is prepared, a suction manifold connected between said vehicle engine and said carburetor for supplying the air-fuel mixture to said vehicle engine, and a throttle valve pivotally supported on said carburetor for adjusting the composition of the air-fuel mixture supplied to said vehicle engine;

a cruise cable connected at one end to said throttle valve, actuator means connected at the other end of said cruise cable for reciprocating said cruise cable relative to said throttle valve to effect reciprocally pivotal movement of said throttle valve and adjust the air-fuel mixture in said carburetor, command switch means having an operating state for activating constant speed control and selecting the predetermined cruising speed, a vehicle speed sensor for sensing an actual vehicle speed, and control means connected to said command switch means, said vehicle speed sensor, and said actuator means for determining the difference between the predetermined cruising speed and the actual speed and providing a signal to said actuator means based on said difference; and means for making a connection between said control means and an electric power source, cancel switch means having an operating state for selectively overriding activation of constant speed control by said command switch means and disabling constant speed control, said command switch means including coast switch means for causing the vehicle speed to be changed to and maintained at a decremental speed less than the predetermined cruising speed, set switch means for causing the vehicle speed to be changed to and maintained at an incremental speed greater than the predetermined cruising speed, and return switch means for causing the vehicle to return from one of the decremental and incremental speeds to the predetermined cruising speed, fault protection means automatically operative immediately after said power source connection is made for selectively prohibiting constant speed control only if said command switch means is in said operating state substantially at the same time that said power source connection is made, said control means including means for disabling said constant speed control until the actual vehicle speed has reached a predetermined minimum speed, means for repeatedly determining whether said cancel switch means is in its operating state until it is determined that said cancel switch means is not in its operating state, means for repeatedly determining whether said cancel switch means is in its operating state and whether the vehicle has reached said predetermined minimum speed until it is determined that said cancel switch means is not in its operating state and that the vehicle has reached said predetermined minimum speed, and means for repeatedly determining whether said cancel switch means is in its operating state, whether the vehicle has reached said predetermined minimum speed, and whether said command switch means is in its operating state, until it is determined that said cancel switch means is not in its operating state, that the vehicle has reached said predetermined minimum speed, and that said command switch means is in its operating state.

* * * * *